(12) United States Patent
Kanai et al.

(10) Patent No.: US 7,130,961 B2
(45) Date of Patent: Oct. 31, 2006

(54) DISK CONTROLLER AND METHOD OF CONTROLLING THE CACHE

(75) Inventors: Hiroki Kanai, Higashiyamato (JP); Kazuhisa Fujimoto, Kokubunji (JP); Akira Fujibayashi, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/785,477

(22) Filed: Feb. 20, 2001

(65) Prior Publication Data

US 2002/0046321 A1    Apr. 18, 2002

(30) Foreign Application Priority Data

Oct. 17, 2000    (JP)    ............................. 2000-316257

(51) Int. Cl.
*G06F 12/00*    (2006.01)
(52) U.S. Cl. ...................... 711/113; 711/124; 711/129; 711/130; 711/141
(58) Field of Classification Search .................. 710/22, 710/36, 52, 74; 711/111, 112, 113, 114, 118, 711/124, 129, 130, 141; 714/2, 3, 5, 42, 714/702; 709/214, 216, 217, 238, 242
See application file for complete search history.

(56) References Cited

U.S. PATENT DOCUMENTS

| | | | | |
|---|---|---|---|---|
| 5,133,060 A | * | 7/1992 | Weber et al. ................ | 711/113 |
| 5,297,258 A | * | 3/1994 | Hale et al. ................... | 711/114 |
| 5,333,305 A | * | 7/1994 | Neufeld ........................ | 714/5 |
| 5,353,430 A | * | 10/1994 | Lautzenheiser ............. | 711/117 |
| 5,724,501 A | * | 3/1998 | Dewey et al. ................. | 714/9 |
| 5,768,623 A | * | 6/1998 | Judd et al. ..................... | 710/37 |
| 6,341,332 B1 | * | 1/2002 | Fujimoto et al. ............. | 711/113 |
| 6,385,681 B1 | * | 5/2002 | Fujimoto et al. ............. | 710/316 |
| 6,393,519 B1 | * | 5/2002 | Fujimoto et al. ............. | 711/113 |
| 6,460,122 B1 | * | 10/2002 | Otterness et al. ............ | 711/154 |
| 6,477,619 B1 | * | 11/2002 | Fujimoto et al. ............. | 711/114 |

FOREIGN PATENT DOCUMENTS

| | | |
|---|---|---|
| JP | 756844 | 3/1995 |
| JP | 9146842 | 6/1997 |
| JP | 1078918 | 3/1998 |

OTHER PUBLICATIONS

Japanese Laid—open No. Hei 12 (2000) -099 281.
I. Matsuoka, "Storage Area Network Now Having Been Widely Applied", SunWorld, Japan, Kabushiki Gaisha IDG Communications, May 1, 1999, vol. No. 5, pp. 36.

* cited by examiner

*Primary Examiner*—Christian P. Chace
(74) *Attorney, Agent, or Firm*—Mattingly, Stanger, Malur & Brundidge, P.C.

(57) ABSTRACT

To execute cache data identity control between disk controllers in plural disk controllers provided with each cache. To prevent a trouble from being propagated to another disk controller even if the trouble occurs in a specific disk controller. The identity control of data is executed via a communication means between disk controllers. In case update access from a host is received, data in a cache memory of a disk controller that controls at least a data storage drive is updated. It is desirable that a cache area is divided into an area for a drive controlled by the disk controller and an area for a drive controlled by another disk controller and is used.

5 Claims, 18 Drawing Sheets

DISK CONTROLLER AND METHOD OF CONTROLLING THE CACHE

BACKGROUND OF THE INVENTION

1. Field of the Invention

The present invention relates a disk sub-system composed of multiple disk units and a disk controller that controls these, particularly relates to a disk controller composing the disk subsystem by plural disk controllers and a method of controlling a cache memory in the disk controller.

2. Description of the Related Art

A disk controller (hereinafter called DKC) stores and reads data in/from multiple disk units (hereinafter called disk drives or merely drives). The disk drives and DKC are generically called a disk subsystem. FIG. 17 shows the configuration of such a conventional type disk sub-system.

In the conventional type disk sub-system, two host computers 0 are respectively connected to two disk sub-systems 1 via a channel 2. A logical disk 7 is a memory area which the host computer 0 recognizes. The host computer 0 instructs to refer to data at a specific address of the logical disk 7 and to request the update of the data via the channel 2. For the channel 2, there are a fiber channel, SCSI and others.

The disk sub-system 1 is roughly composed of DKC 10 and plural drives 17. DKC 10 and the plural drives 17 are connected via a drive interface 16. For the drive interface 16, a fiber channel, SCSI and others are used.

DKC 10 is roughly composed of a channel controller 11 that controls channels, a disk drive controller 14 that controls drives, a control memory 12 that stores the control information 3 of DKC, a cache memory part 13 that stores read data 5 and update data 6 and further, a connection mechanism 15 that mutually connects each component. For the connection mechanism 15, a bus, an interconnection network and others are used.

DKC 10 executes the reference of data and update processing according to the instruction of the host computer 0. Such a conventional type disk subsystem is disclosed in Japanese published unexamined patent application No. Hei 12-99281 for example.

In recent computer environment as represented by the explosive popularization of the Internet, storage capacity used by a user rapidly increases. As a result, the management cost of daily increasing data also continues to increase and the reduction of the management cost is an important problem. Also, a storage area network (hereinafter called SAN) for centralizing disk subsystems heretofore connected each server and as a result distributed, attracts attention. FIG. 18 shows a conventional type example of disk subsystems in SAN environment. Plural sub-systems are connected to the host computers 0 via SAN-SW 11. One disk sub-system is composed of only one disk controller.

As described above, the further increase of storage capacity and the increase of the number of connected channels are demanded for a disk subsystem by the change of environment surrounding the disk subsystem.

It is conceivable in consideration of such a background that a disk sub-system heretofore composed of one DKC is composed of plural DKCs. Hereby, for a disk subsystem, larger storage capacity and the more number of connected channels can be provided.

For a general method of composing plural DKCs, it is conceivable to compose DKC by clusters. However, in this case, there is a problem that it is difficult to share data between DKCs. To solve this problem, it can be realized to share data by enabling the mutual access of data between DKCs using connection means between DKCs.

SUMMARY OF THE INVENTION

However, in a disk sub-system composed of plural DKCs mutually accessible to data, the identity of data between cache memories in each DKC is important. This is generally called coherence control.

Particularly, in the case of a disk sub-system, as data in a drive is the last stage of user data, it is important to guarantee this data and for example, even if a failure occurs in one DKC in a disk sub-system and the DKC goes down, the trouble should not be propagated to another DKC. However, in case data in a drive connected to another normally operable DKC is left in the cache memory of the DKC in which the trouble occurs with the data updated, the data is lost though the drive storing the data and DKC controlling the drive are normal because access to the data is disabled. That is, the failure of one DKC in a sub-system is propagated to another DKC in the same sub-system to be a problem.

Each disk controller is provided with a cache memory that stores data for a drive connected to another disk controller except a disk controller that receives an access request from a host via a communication means between disk controllers in addition to data for a drive connected to the disk controller that receives the access request from the host and a control memory that stores the control information of the cache memory.

Further, the disk controller includes a cache management table storing a cache directory in which a disk controller storing data in its cache can be specified referring to the data of the destination of access and a cache address at which data at the destination of access is stored every unit of access uniquely determinable based upon the address of the disk controller and a drive as control information for controlling the cache provided in the disk controller.

A disk controller that receives an access request from a host computer executes the exclusive operation of access data at the beginning of processing and afterward, after the access request is processed and the completion is reported to the host, coherence control is executed in case access from the host computer is a request for update access and a disk controller except the access acceptance disk controller stores the access data in its cache memory and afterward, the exclusion of the data is released.

A disk controller that receives a request for update access from a host computer stores update data received from the host computer in a cache memory of another disk controller connected to the following drive via a communication means between disk controllers in case the destination of the update access is the drive connected to another disk controller except the disk controller.

In a coherence control method, data stored in the cache of another disk controller is invalidated or updated.

A disk controller that receives a request for read access from a host computer first determines whether access data is stored in a cache of the disk controller that receives the access request or not, referring to a directory in a cache configuration table of a disk controller connected to a drive at the destination of access, in case the data is stored, the data is transferred to the host computer, referring to the cache at once, in the meantime, in case the access data is not stored in the cache in the disk controller that receives the access request, it is determined referring to a directory in a cache configuration table of a disk controller connected to a drive at the destination of access whether access data is stored in the cache memory of the disk controller connected to the drive at the destination of access or not, in case the data is stored, the data is transferred to the cache in the disk controller that receives the access request and the host computer at once, referring to the cache memory, and in the meantime, in case the data is not stored in the cache memory of the disk controller connected to the drive at the destination of access, data is transferred from the drive to the cache memory of the disk controller connected to the drive at the destination of access, the cache memory in the disk controller that receives the access request and the host computer.

In case a cache area is freed, update data stored in a cache is stored in a drive connected to its disk controller and further, the data in a cache memory storing the data in a disk sub-system of another disk controller is invalidated.

As a cache memory provided in each disk controller stores only data of a drive connected to a disk controller, data is transferred from a cache or a drive of a disk controller at the destination of a request to a host in case the access request from the host computer is read access or data is transferred to a cache of a disk controller at the destination of a request in case the access request from the host computer is update access.

The storage area of a cache memory is divided into an area in which data for a drive connected to a disk controller that receives access is stored and an area in which data for a drive connected to another disk controller in a subsystem is stored and is managed.

Data for a drive connected to a disk controller that receives access is stored in its cache memory with the data doubled or multiplexed and in the meantime, data for a drive connected to another disk controller in a sub-system is stored without being multiplexed in the cache.

A cache provided to a disk controller is composed of a nonvolatile cache storing data for a drive connected to a disk controller that receives access and a volatile cache storing data for a drive connected to another disk controller in a subsystem.

In case a failure occurs in a disk controller in a sub-system, data of a drive connected to the disk controller where the failure occurs, which is stored in a cache memory of a normal disk controller, is invalidated.

A communication means between disk controllers is a part of a channel connectable to a host computer and a switch that connects channels.

For control information for controlling a cache provided in a disk controller, an access log table storing access frequency information assigned to each channel, each disk controller and each logical disk is provided, it is determined whether a channel the access frequency of which is the highest of channels that receive access to a certain logical disk and a logical disk at the destination of access are connected to the same disk controller or not, and in case they are not connected to the same disk controller, the logical disk is relocated in a drive of a disk controller to which the channel the access frequency of which is the highest is connected. Also, in case they are connected to the same disk controller, a host computer that accesses to the logical disk and uses another channel uses a channel of a disk controller connected to the logical disk.

DESCRIPTION OF THE PREFERRED EMBODIMENTS

Figure 1:
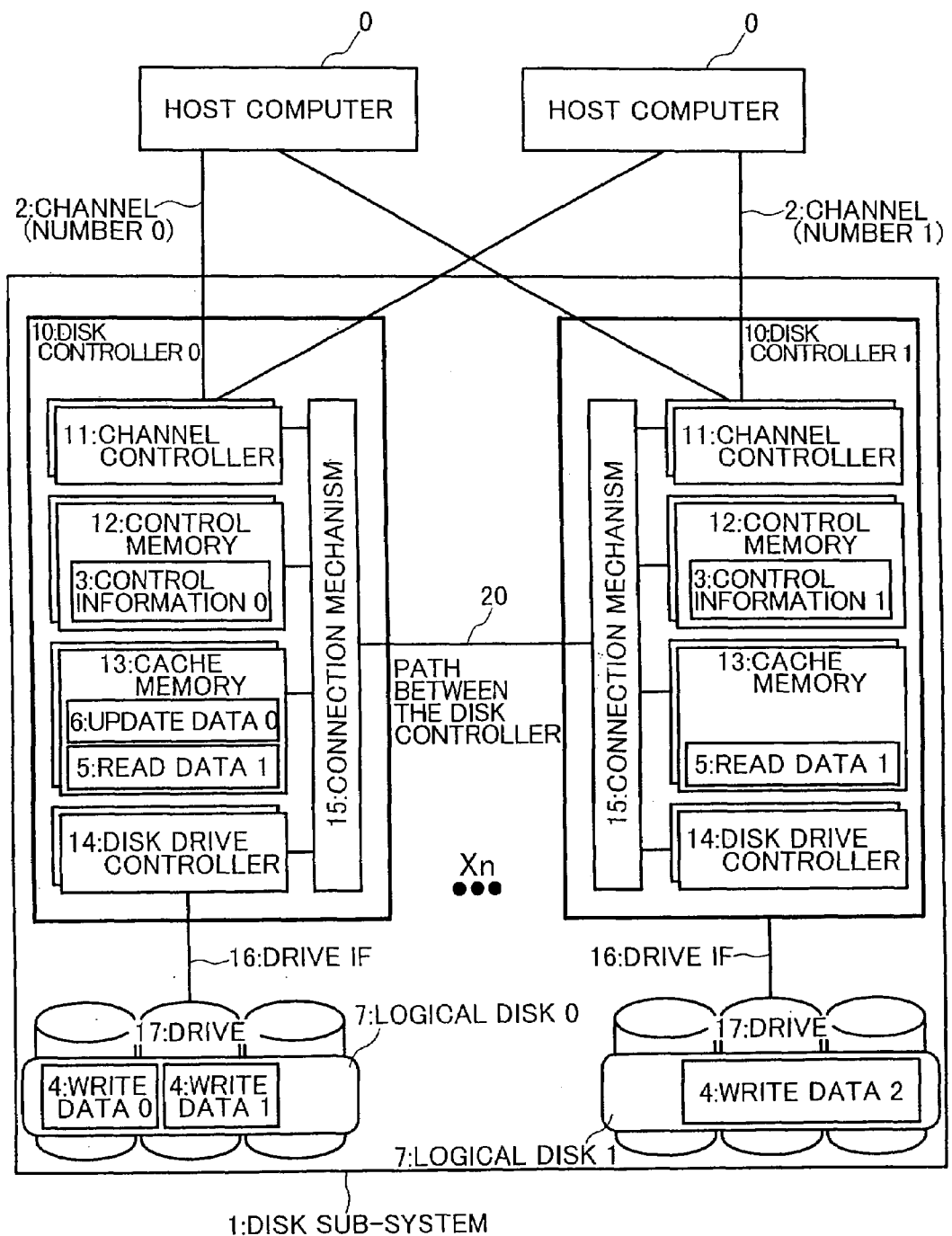
FIG. 1 is an example of a block diagram showing the outline of a disk controller according to the invention.

Referring to the drawings, the details of the invention will be described below.

First, referring to FIGS. 1 and 2, a disk controller according to the invention will be described. FIG. 1 is an example of a block diagram showing the outline of the disk controller according to the invention. A disk sub-system 1 is connected to host computers 0 via plural channels 2. This embodiment is characterized in that the disk sub-system 1 is composed of plural DKCs 10 and each DKC 10 can refer to and update write data 4 stored in a drive 17 connected to another DKC via a path between disk controllers 20 dedicated to each DKC 10. The details will be described below.

The disk sub-system 1 shown in FIG. 1 is roughly composed of plural DKCs 10 and drives 17. In FIG. 1, only two DKCs 10 are shown in detail, however, the configuration of each of Xn DKCs 10 is the same. DKC 10 is roughly composed of a channel controller 11 that controls channels, a disk drive controller 14 that controls a drive, a control memory 12 that stores the control information 3 of DKC, a cache memory part 13 that stores read data 5 and update data 6 and further, a connection mechanism 15 that mutually connects each component. Though the following processor is not shown, the channel controller 11 and the disk drive controller 14 are provided with a processor for control and a processing program is run in the processor.

Figure 2:
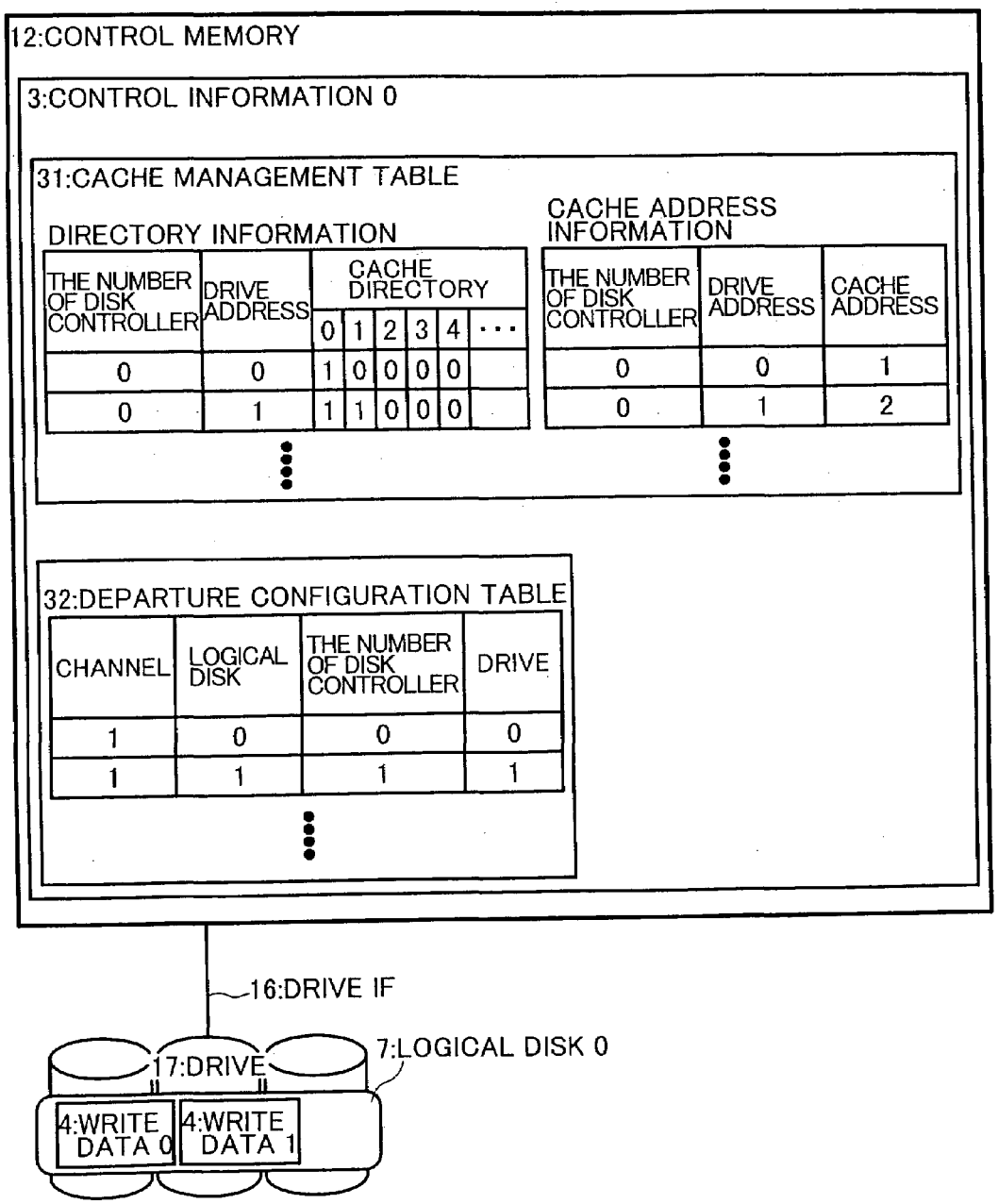
FIG. 2 is an example of a block diagram showing cache control information of the disk controller according to the invention.

FIG. 2 is a block diagram showing an example of control information stored in the control memory 12 shown in FIG.

1. In this embodiment, control information 3 is roughly composed of a cache management table 31 and a departure configuration table.

First, the cache configuration table 31 will be described in detail. The cache management table 31 includes directory information and cache address information. In this embodiment, directory information and cache address information are described as an individual table, however, these may be also included in the same table. Directory information shows relationship between the address of a drive at the destination of access from a host and a cache storing the data of the address. Concretely, directory information includes a disk controller number and a drive address at the destination of access for an address at the destination of access from a host and further includes a directory showing whether each cache in the sub-system stores the data of the address or not for every cache. In this embodiment, a cache directory is prepared for every DKC and shows that in case '1' is on, the cache of DKC stores data and in case '0' is on, the cache of the DKC stores no data. Therefore, the directory information shows that the data of a disk controller number 0 and a drive address 0 is stored in the cache of DKC 0. Also, the directory information shows that the data of the disk controller number 0 and a drive address 1 is stored in both the cache of DKC 0 and the cache of DKC 1.

Next, cache address information shows relationship between a drive address at the destination of access from a host and the address of a cache storing the data of the address. Like directory information, cache address information includes a disk controller number and a drive address at the destination of access for an address at the destination of access from a host computer and shows the address of a cache storing the data of the address. Cache address information may also store only the address of a cache in DKC.

Next, the departure configuration table will be described in detail. The departure configuration table shows relationship among a channel number and a logical disk which a host computer can respectively identify and a drive in which data is actually stored in DKC. In this embodiment, a logical disk 0 having a channel number of 1 is allocated to a drive number 0 of a disk controller number 0. Also, a logical disk 1 having a channel number of 1 is allocated to a drive number 1 of a disk controller number 1.

When control information 3 described above is used, a disk controller number and a drive number at the destination of a request for access from a host can be identified by referring to the departure configuration table 32, further, the number of a cache memory storing data at the destination of the access can be identified by referring to directory information in the cache management table 31 and further, the address of a cache storing the data at the destination of the access can be understood by referring to cache address information in the corresponding cache memory.

In this embodiment, the departure configuration table 32 is stored in the control memory 12, however, the departure configuration table 32 may be also stored in a local memory of a control processor provided to the channel controller 11 and the disk drive controller 14.

Next, referring to flowcharts shown in FIGS. 3 to 10, the operation of DKC and a method of controlling a cache memory in case a request for access from a host computer is received will be described.

Figure 3:
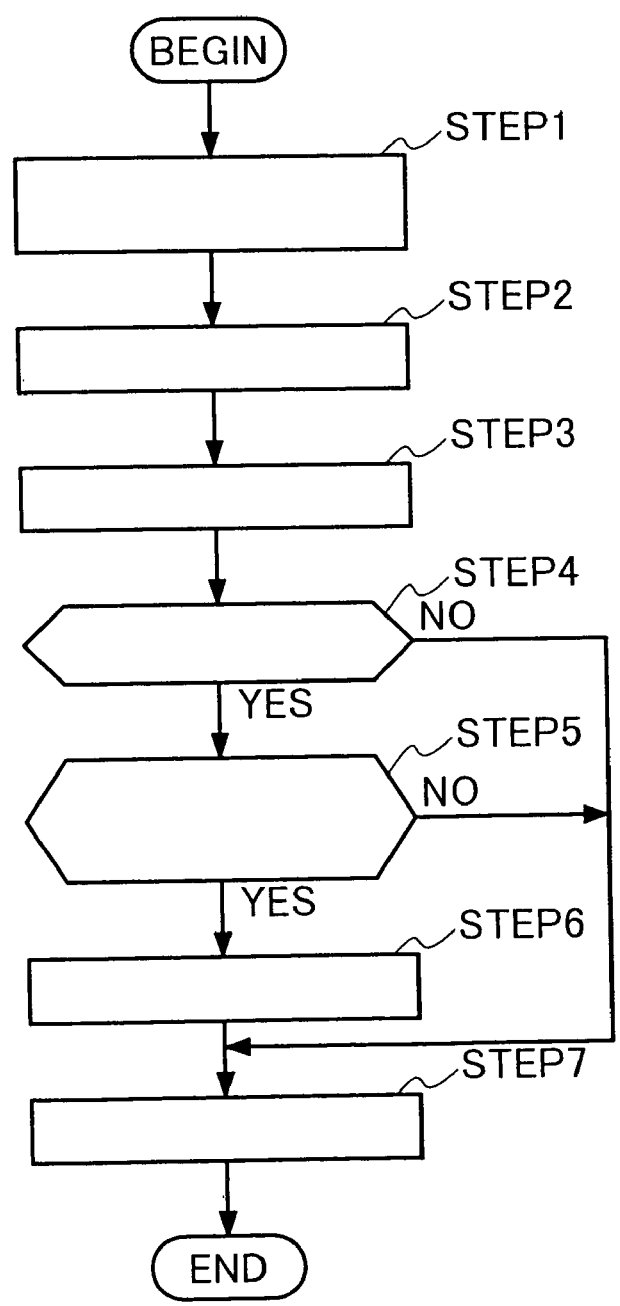
FIG. 3 is a flowchart showing an example of the whole operation according to the invention.

First, referring to FIG. 3, the outline of processing will be described. FIG. 3 is a flowchart showing the flow of the whole processing of DKC. The processing shown in the flowchart can be realized as a processing program run in a processor in DKC. DKC that receives a request for access from a host computer first executes the processing of a received command and the exclusive operation of access data (a step 1). It can be identified by analyzing the command according to the protocol of a connecting channel whether the request for access is a read command, that is, a request for reference or a write command, that is, a request for update. Further, DKC executes exclusive operation so that data at the destination of access is not updated or referred by another access processing. The exclusive operation may be executed by a general method by locking and others. Next, DKC executes reference or update processing according to the command (a step 2). Next, after the processing is finished, DKC reports the completion to the host (a step 3) and determines the received command (a step 4). In case the command is not a write command, processing proceeds to a step 7 described later. In case the command is a write command, it is next determined whether data at the corresponding address which the host accesses can be stored in the cache memory of another DKC in the subsystem or not (a step 5). In case another DKC cannot store the data in its cache memory, processing proceeds to the step 7 and is finished. In case another DKC can store the data in its cache memory, coherence processing for update data is executed (a step 6). Finally, the exclusion of the data at the destination of the access is released (the step 7). This embodiment is characterized in that in write command processing, in case another DKC stores old data in its cache, coherence processing is applied to the data. The details of command processing and coherence processing will be respectively described later.

Figure 4:
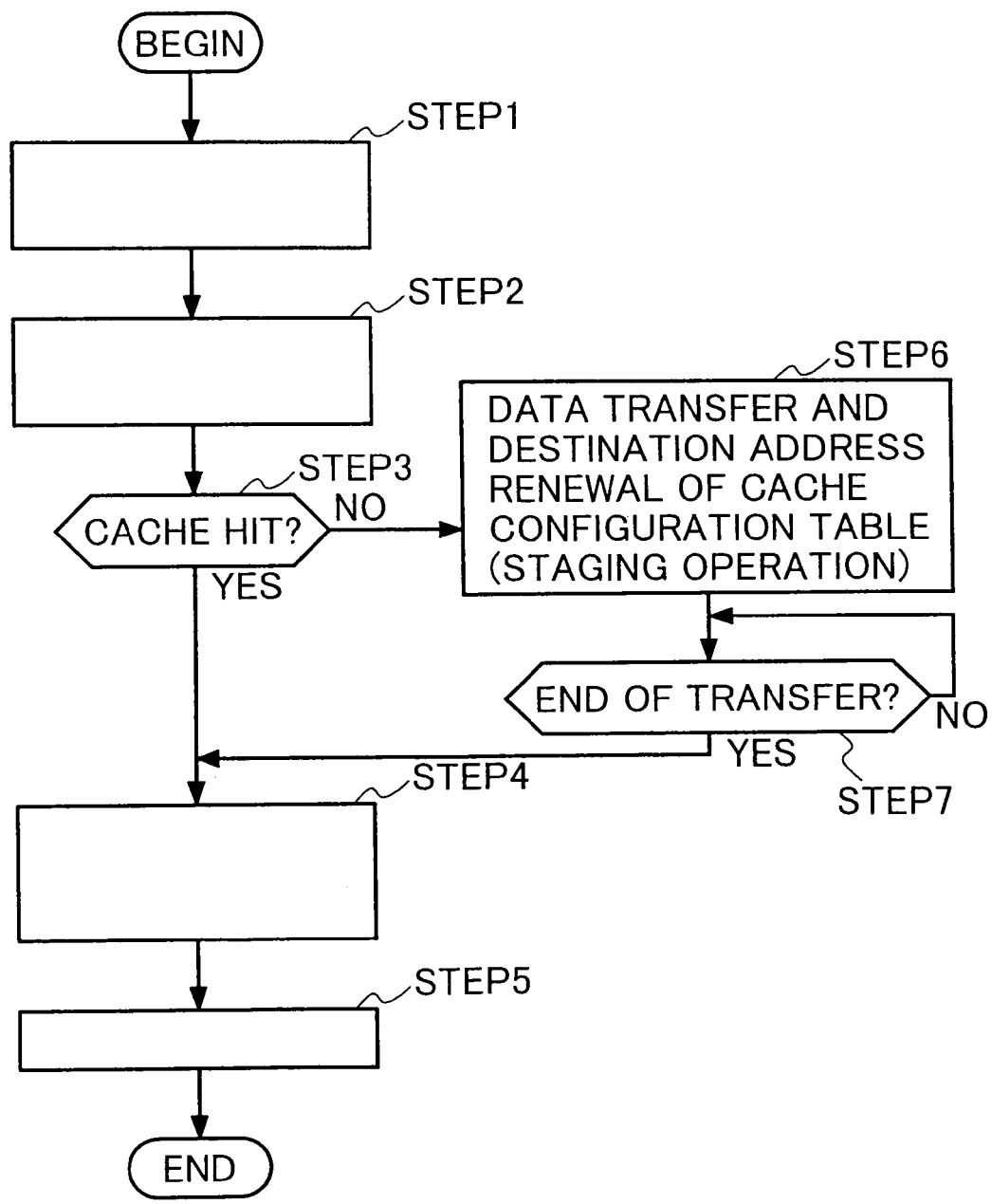
FIG. 4 is a flowchart showing an example of update access request processing according to the invention.

FIG. 4 is a flowchart showing an example of processing when a write command is received. When a command is received, the command and an address at the destination of access are analyzed based upon the received command and it is recognized that the access is write access (a step 1). For an address at the destination of access, a disk controller number and a drive number at the destination of an access request can be identified by referring to the departure configuration table. Next, the determination of a cache hit error is applied to the cache memory of the corresponding DKC identified in the step 1 (a step 2). It can be identified by referring to directory information in the cache management table whether data at the destination of access is stored in the cache or not. In the case of a hit error that no data at the destination of access is stored in the cache, the disk drive controller of the corresponding DKC is requested to transfer the corresponding data from a drive to the cache memory (a step 6). This processing is normally called staging processing. In this case, write processing is interrupted until the transfer is finished (a step 7) and after staging is finished, write processing is continued again. A cache address at the destination of transfer may be managed and acquired by a general method such as a list of a space area in the cache, however, it is required to register the address at the destination of transfer by updating the cache management table. In the case of determination as a hit in a step 3 or in case staging processing is finished in the step 7, the corresponding data in the cache memory of the corresponding DKC is updated (a step 4). After the update is finished, the completion of write processing is reported to the host computer (a step 5). This embodiment is characterized in that the cache memories of all DKCs in a subsystem can be accessed by referring to a cache directory and a cache address in a cache management table.

Figure 5:
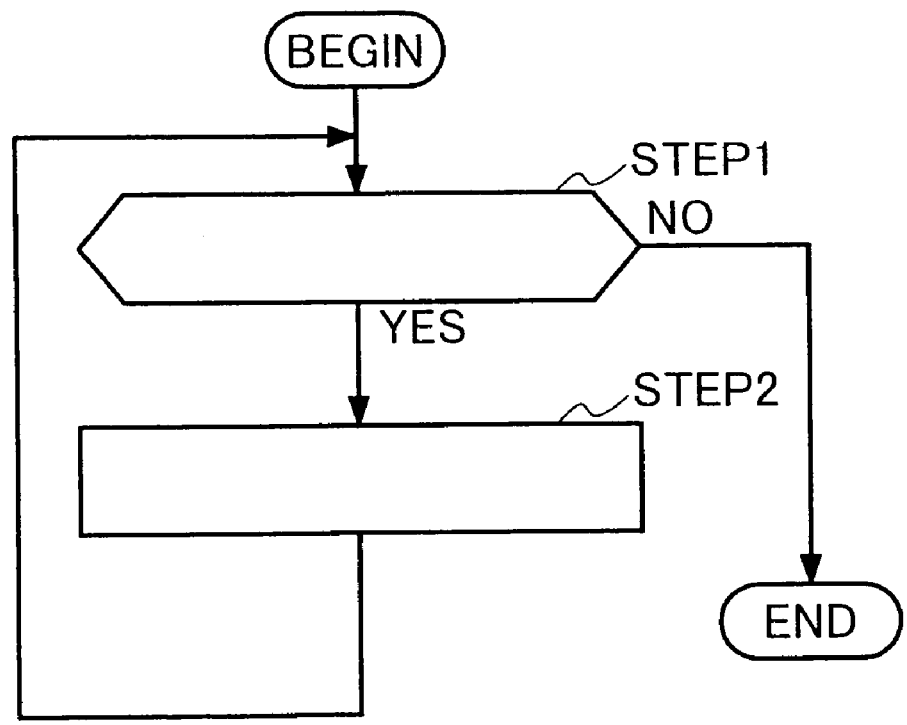
FIG. 5 is a flowchart showing an example of coherence processing according to the invention.

FIG. 5 is a flowchart showing an example of the coherence control of a cache memory performed next to write processing when a write command is received. This embodiment is characterized in that data in another cache memory is invalidated. It is determined by referring to directory information in a cache management table whether there is a cache memory of another DKC storing old data at an update request address or not (a step 1). In case there is no cache memory storing old data of another DKC, the processing is finished. In case there is a cache memory storing old data of another DKC, the directory information is updated. For example, in this embodiment, as a stored state is shown by 1, 0 has only to be written as directory information. Further, it is required to release an area storing old data in the corresponding cache memory. An address storing old data in the corresponding cache memory can be recognized by referring to cache address information of the corresponding DKC. The cache address is deleted from the cache address information and the cache memory area has only to be recorded in a list of a space area of the cache memory. As described above, the cache memory storing the data of another DKC is invalidated (a step 2).

Figure 6:
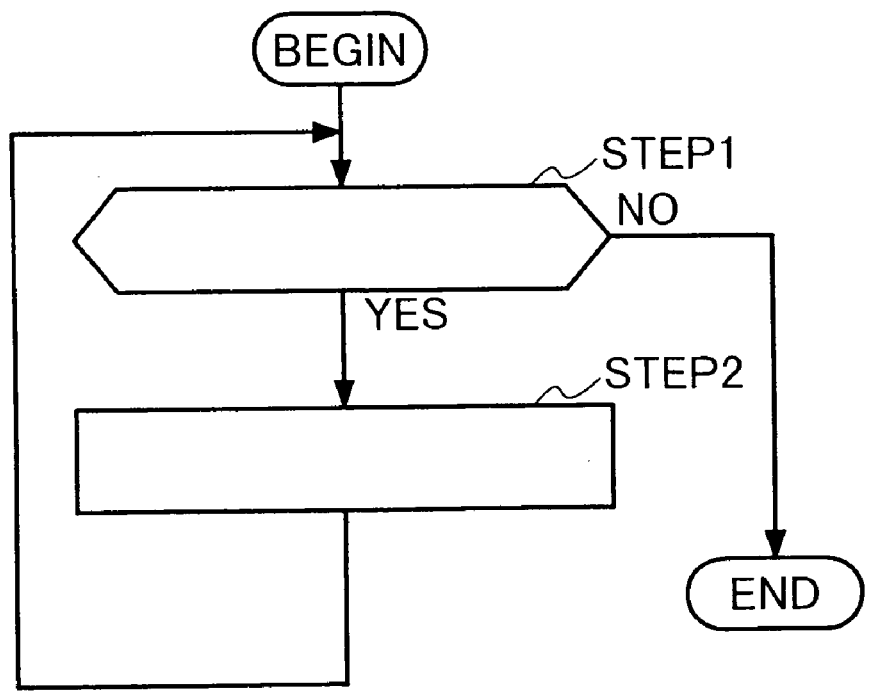
FIG. 6 is a flowchart showing an example of the coherence processing according to the invention.

FIG. 6 is a flowchart showing another example of the coherence control of a cache memory performed next to write processing when a write command is received. This embodiment is characterized in that data in another cache memory is updated. It is determined by referring to directory information in a cache configuration table whether there is a cache memory storing old data at an update request address of another DKC or not (a step 1). In case there is no cache memory storing the old data of another DKC, the processing is finished. In case there is a cache memory storing the old data of another DKC, the data is updated. An address at which the old data is stored in the cache can be recognized by referring to the cache address information of the DKC. Update data has only to be written at the cache address. As described above, the cache storing the data of another DKC is updated (a step 2).

Figure 7:
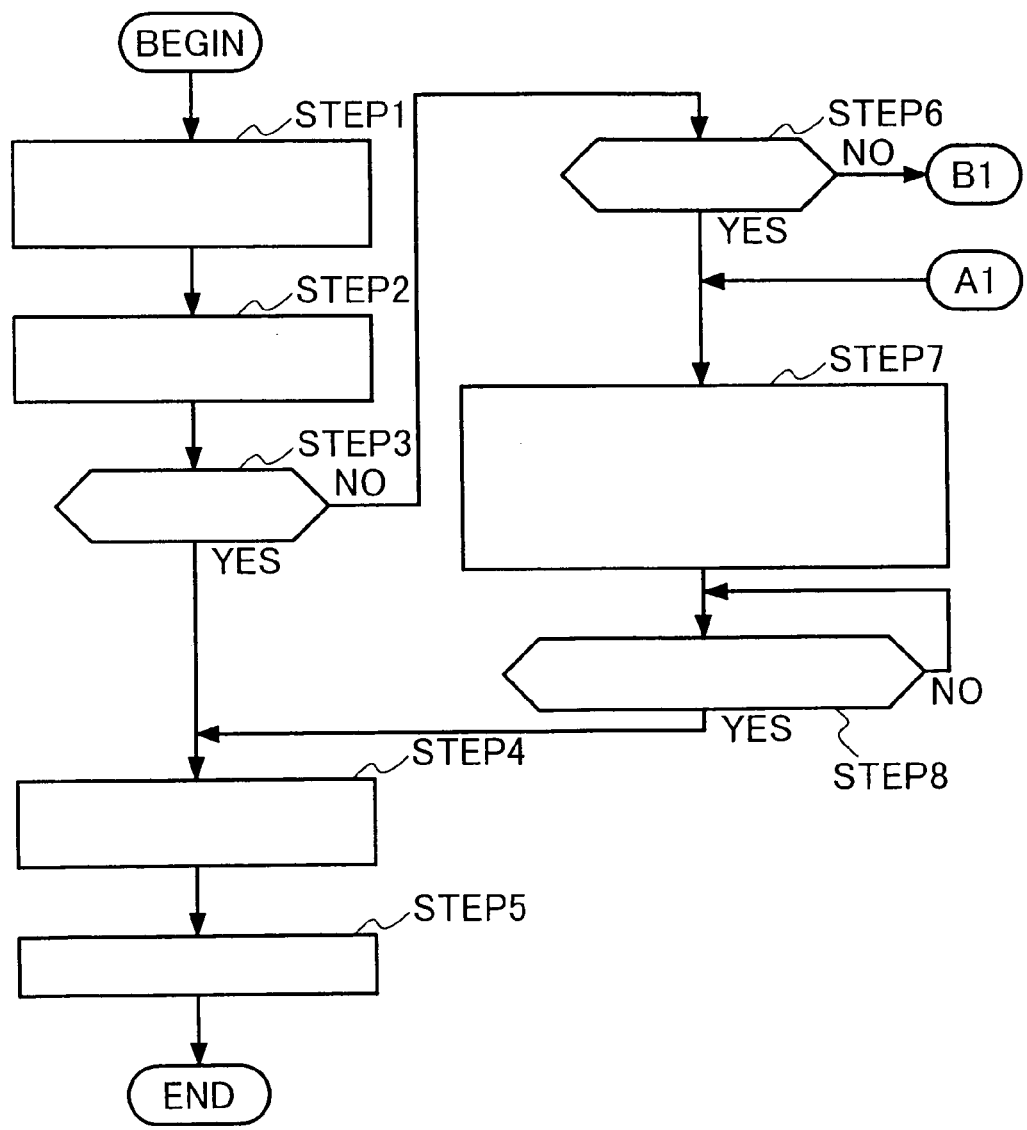
FIG. 7 is a flowchart showing an example of read access request processing according to the invention.
Figure 8:
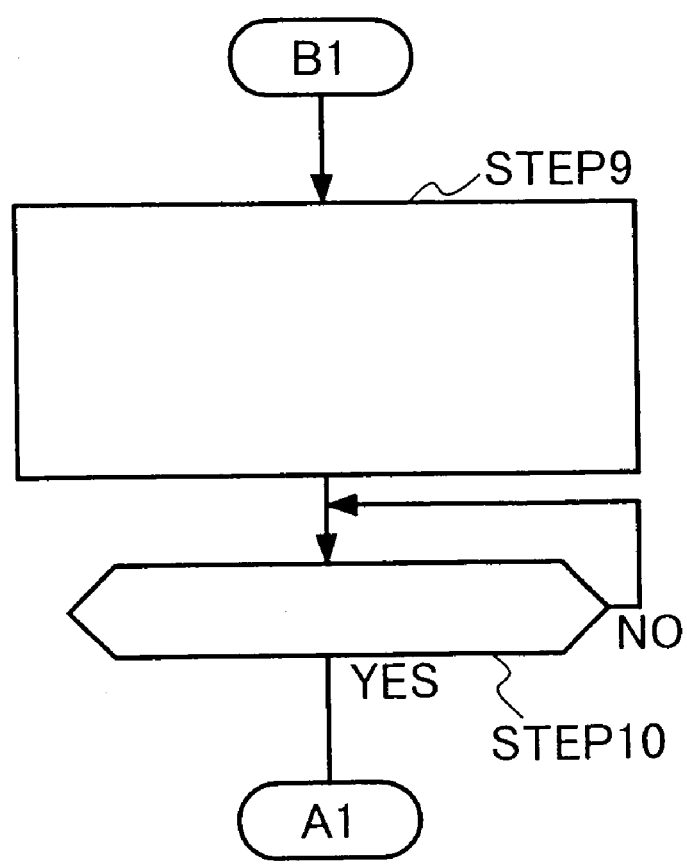
FIG. 8 is a flowchart showing an example of the read access request processing according to the invention.

FIGS. 7 and 8 are flowcharts showing an example of processing when a read command is received. In this embodiment, a case that data managed by another DKC can be stored in a cache memory via a path between DKCs will be described. When a command is received, the command and an address at the destination of access are analyzed based upon the received command and it is recognized that the access is a read access (a step 1). For an address at the destination of access, a disk controller number and a drive number at the destination of an access request can be identified by referring to a departure configuration table. Next, it is determined whether data is stored in a cache memory of the corresponding DKC identified in the step 1 or not (a step 2). It can be identified by referring to directory information in a cache management table whether data at the destination of access is stored in the cache memory or not. It is determined whether the data is stored in the cache memory of DKC that receives the command or not (a step 3) and in case the data is stored in the cache memory of DKC that receives the command, the data is read from the cache memory of DKC that receives the command at once (a step 4). Further, the data is transferred to a channel (a step 5). In the meantime, in the case of a cache hit error in the step 3, it is determined whether data at the destination of access is stored in a cache memory of DKC connected to a drive at the destination of access or not (a step 6). In case the data is stored in the cache memory of DKC connected to the drive at the destination of access, the data is transferred from the cache memory of DKC connected to the drive at the destination of access to the cache memory of DKC that receives the command. At this time, an address for data to be stored of the cache memory of DKC that receives the command may be acquired from a list of a space area of the cache memory and others, however, it is required to write the address to cache address information in the cache management table of DKC that receives the command. Further, directory information in the cache management table of DKC connected to the drive at the destination of access is updated to show that the data is copied in the cache of DKC that receives the command (a step 7). After the termination of transfer is awaited (a step 8), the processing is returned to the step 4. In the meantime, in the case of cache hit error in the step 6, it is required to read data from a drive. This processing is normally called staging processing (a step 9) and this step is similar to the step 6 shown in FIG. 4. After the termination of transfer is awaited (a step 10), the processing is returned to the step 4.

Figure 9:
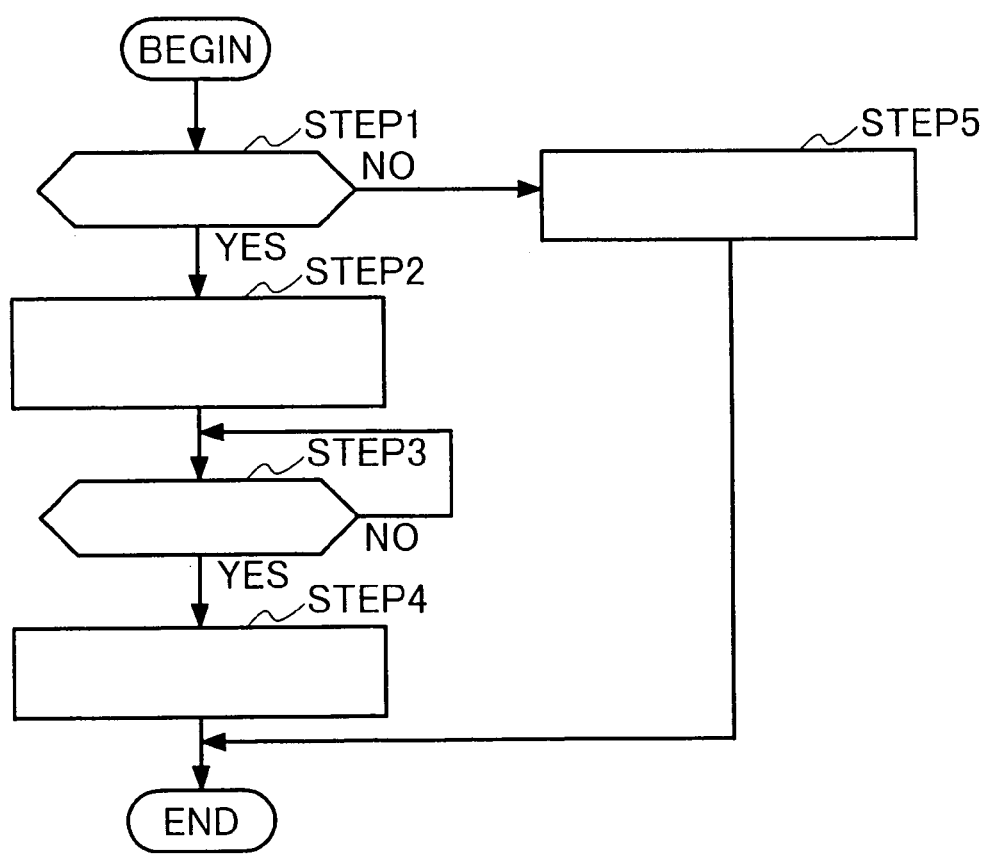
FIG. 9 is a flowchart showing an example of a cache management method according to the invention.

FIG. 9 is a flowchart showing an example of a method of freeing a cache area in case data can be stored in cache memories between DKCs. In case there is no space area in a cache, it is required to free an area of the cache according to a predetermined algorithm. For a general algorithm, LRU can be given. According to this method, first, an area to be freed is determined according to a predetermined algorithm. Afterward, it is determined whether data currently stored in the area to be freed is data of a drive connected to DKC or not (a step 1). This determination is enabled by referring to cache address information in a cache management table. In case the data is not data of the drive connected to the DKC, directory information in a cache management table of DKC connected to and controlling a drive in which the corresponding data is stored is updated to show that the cache memory of the DKC does not store the data (a step 5). In the meantime, in case it is determined in the step 1 that the data is data of the drive connected to the DKC, a disk drive controller is requested to write the corresponding data to the drive (a step 2). This processing is normally called destaging processing. After the termination of writing is awaited (a step 3), the data in a cache of another DKC storing the copy of the data is invalidated according to the directory information in the cache management table (a step 4).

Figure 10:
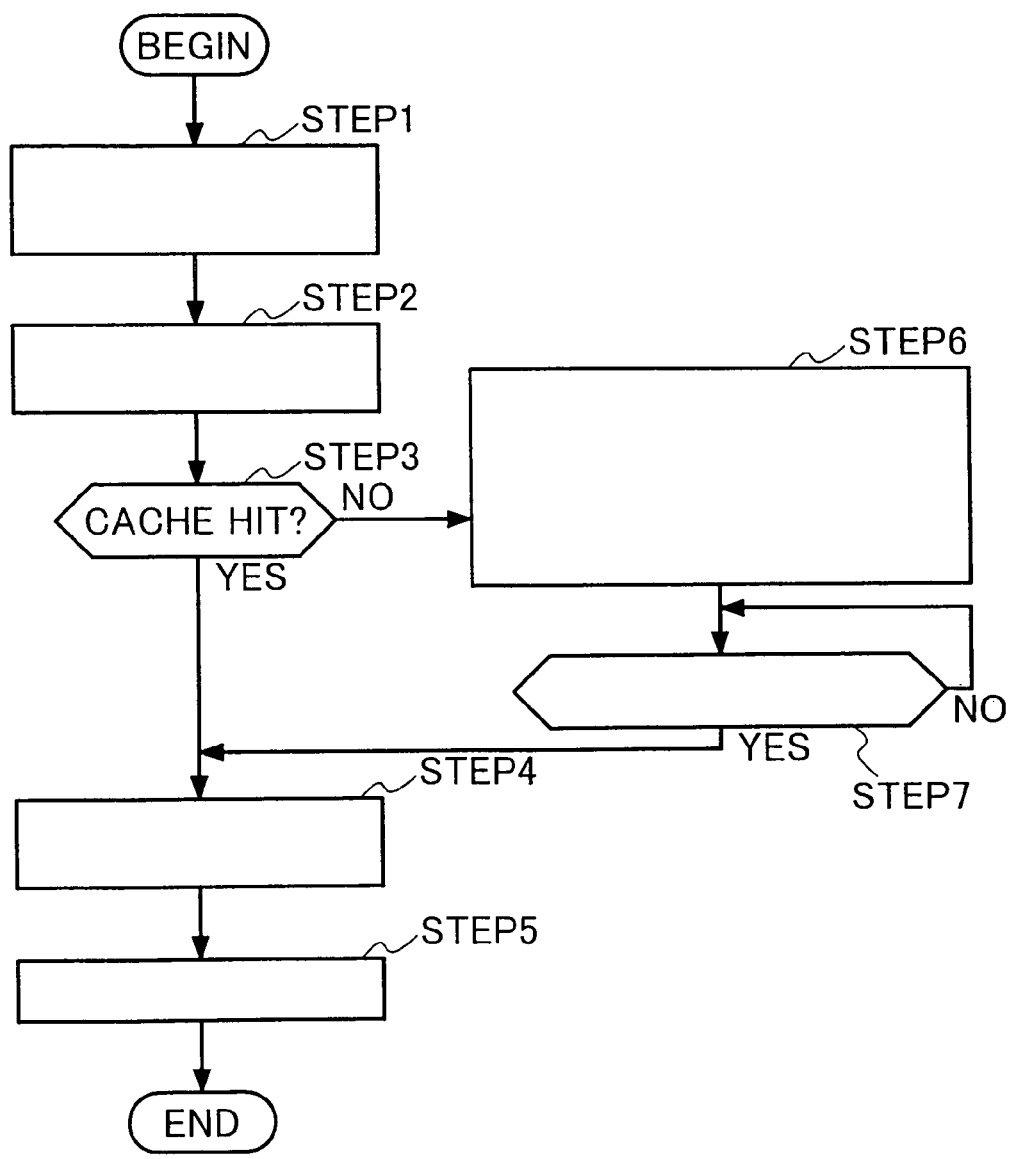
FIG. 10 is a flowchart showing an example of the read access request processing according to the invention.

FIG. 10 is a flowchart showing an example of processing when a read command is received. In this embodiment, a case that data managed by another DKC cannot be stored in a cache memory between DKCs will be described. When a command is received, the command and an address at the destination of access are analyzed based upon the received command and it is recognized that the access is read access (a step 1). For an address at the destination of access, a disk controller number and a drive number at the destination of an access request can be identified by referring to a departure configuration table. Next, it is determined whether the corresponding data is stored in a cache memory of the corresponding DKC identified in the step 1 or not (a step 2). It can be identified by referring to directory information in a cache management table whether data at the destination of access is stored in the cache or not. It is determined whether the corresponding data is stored in a cache memory of DKC connected to a drive at the destination of access or not (a step 3) and in case the data is stored in the cache of DKC connected to the drive at the destination of access, the data is read from the cache of DKC connected to the drive at the destination of access at once (a step 4). Further, the data is transferred to a channel (a step 5). In the meantime, in the case of a cache hit error in the step 3, it is required to read data from the drive. This processing is normally called staging processing (a step 6) and this step is similar to the step 6 shown in FIG. 4. After the termination of transfer is awaited (a step 7), the processing is returned to the step 4.

Figure 11:
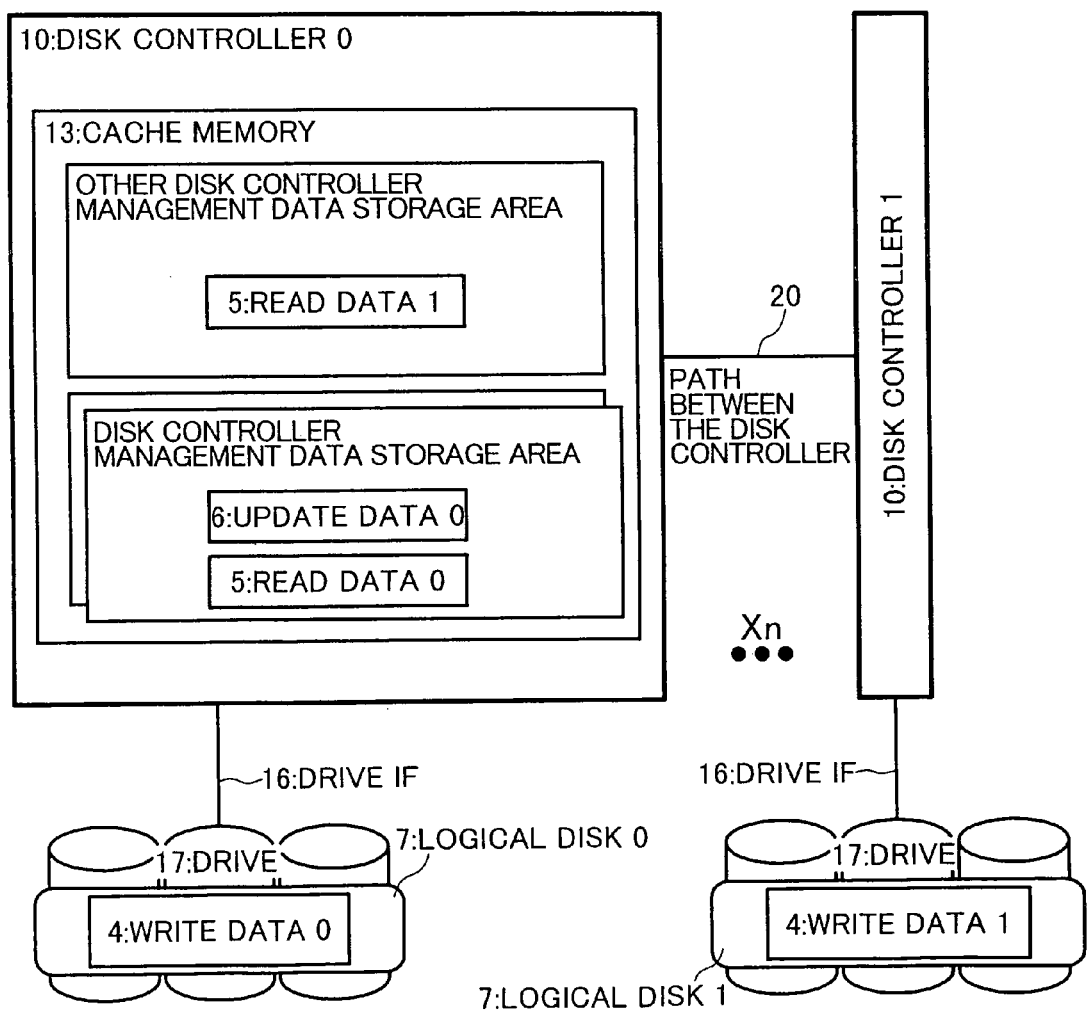
FIG. 11 is an example of a block diagram showing a cache of the disk controller according to the invention.

Next, referring to FIG. 11, desirable another example of a method of controlling a cache memory will be described. This embodiment is characterized in that an area of the cache memory 13 is divided into a data storage area for another DKC and a data storage area for DKC. As a result, the doubling and multiplexing of data described later or the nonvolatilization of a part of a cache can be realized easily and at a low cost. To divide an area, a list for managing a space area of the cache memory is required for every area.

In this embodiment, only a data storage area for DKC is doubled. Update data from a host is stored in a cache memory of DKC connected to a drive in which the data is stored, that is, in a data storage area for DKC. Therefore, the reliability can be enhanced by doubling the data storage area for DKC. Also, the reliability can be secured at a low cost by doubling only the data storage area for DKC, compared with a case that the whole cache memory 13 is doubled.

Figure 12:
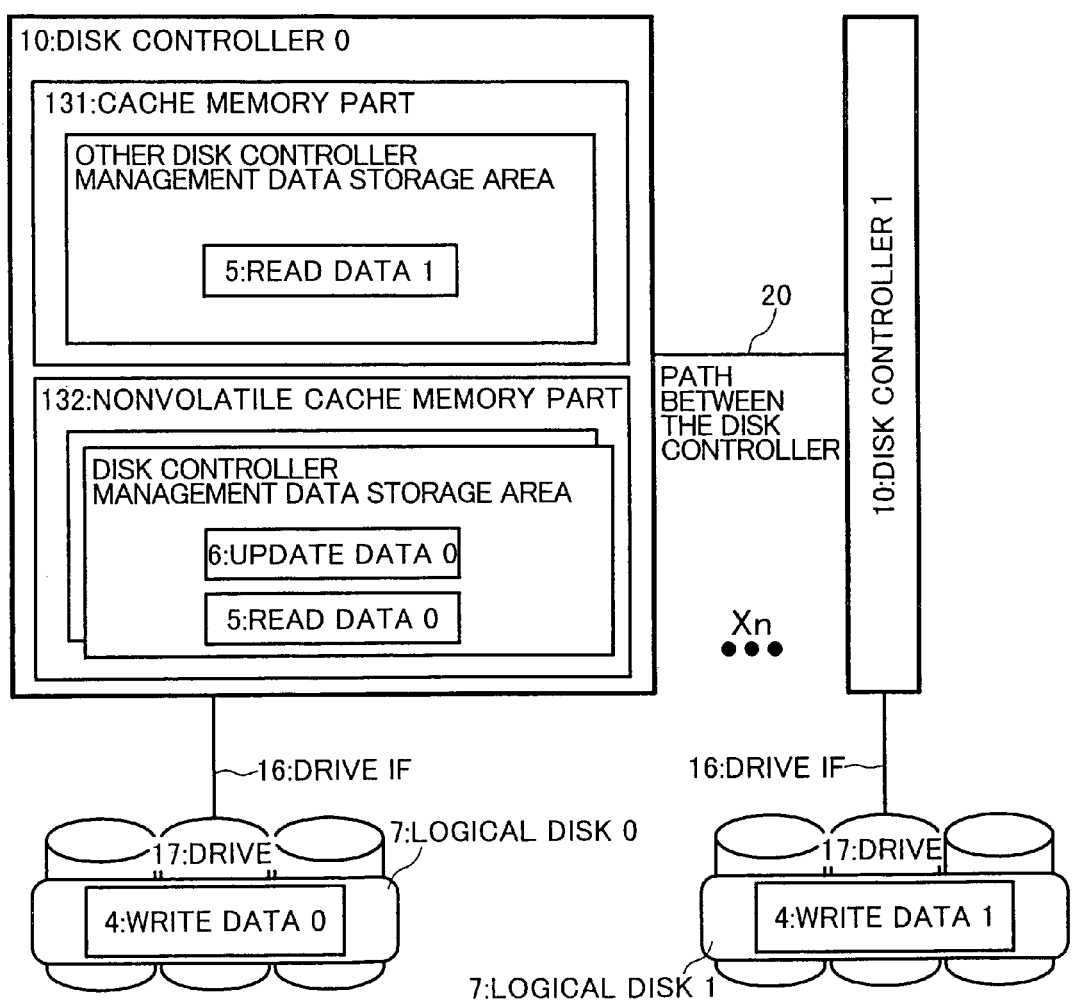
FIG. 12 is an example of a block diagram showing a cache of the disk controller according to the invention.
Figure 13:
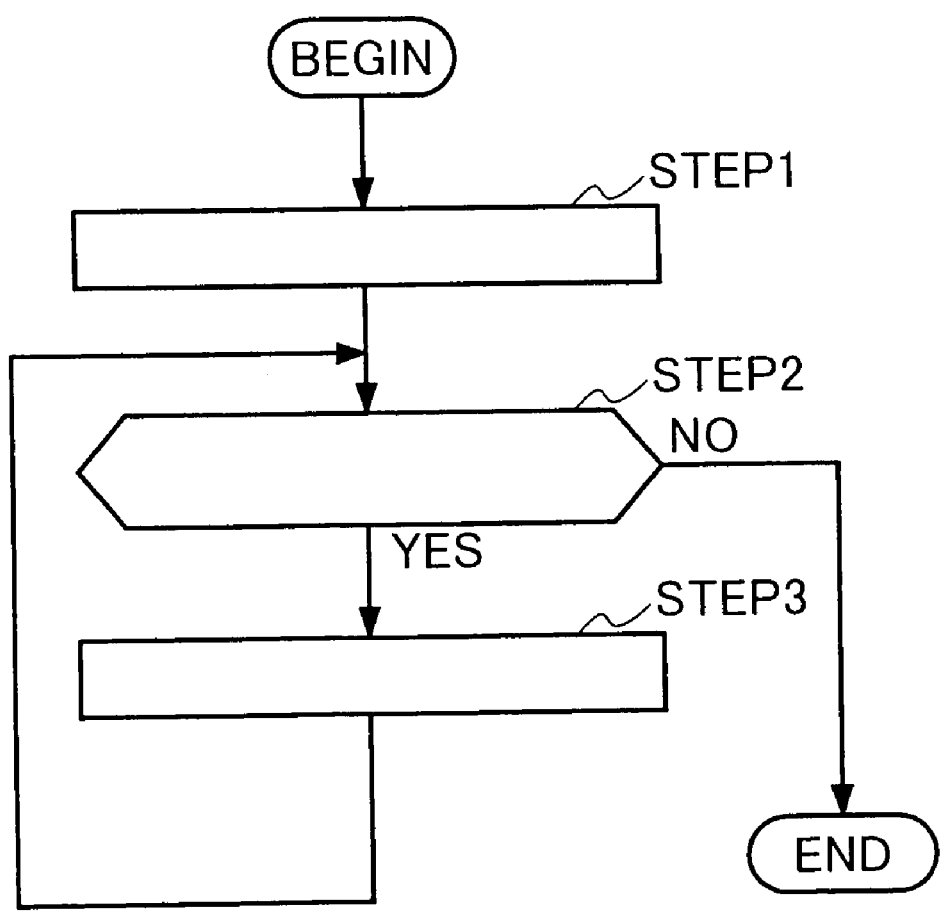
FIG. 13 is a flowchart showing an example of the cache management method according to the invention.
Figure 14:
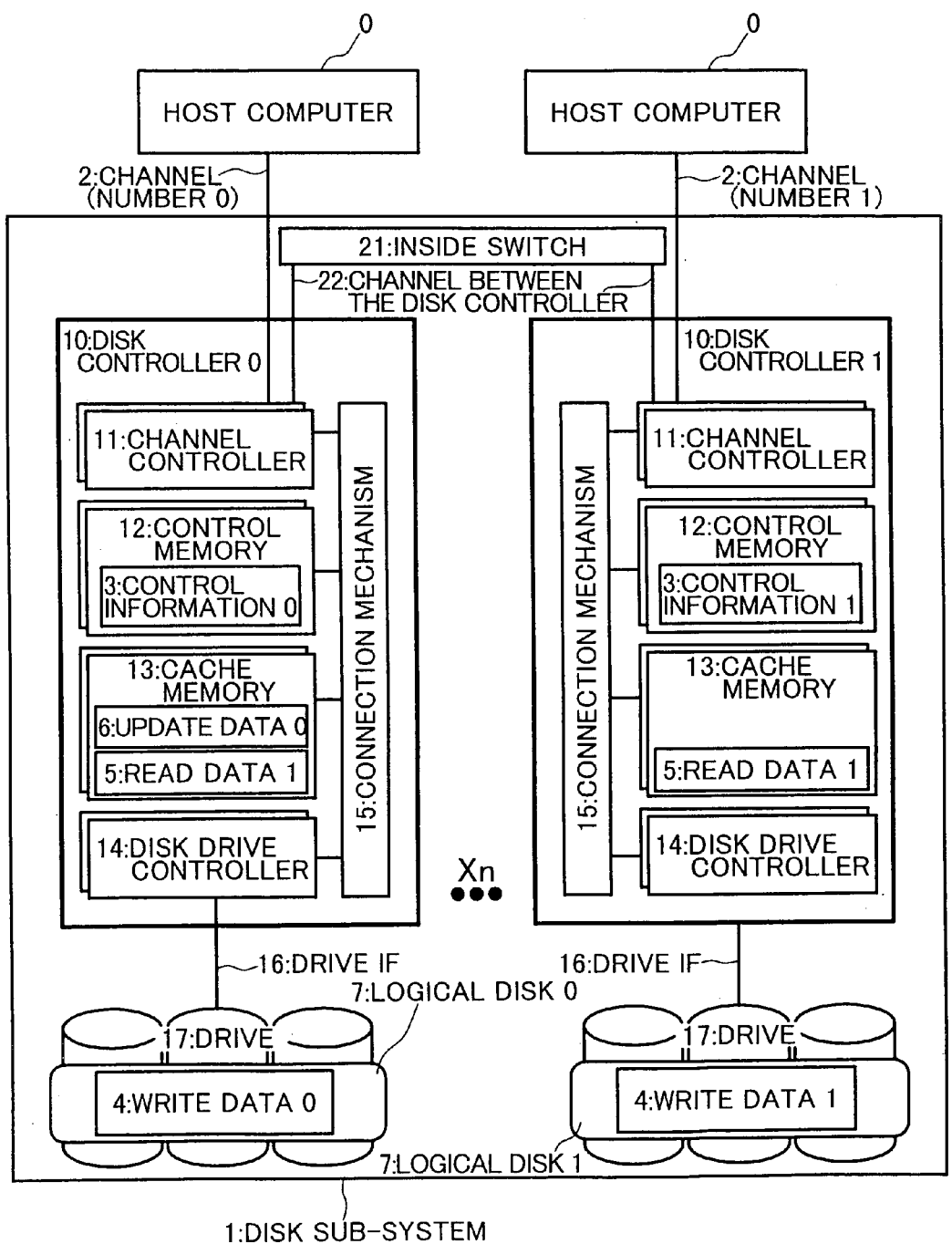
FIG. 14 is another example of a block diagram showing the outline of the disk controller according to the invention.

Next, referring to FIG. 12, desirable another example of a method of controlling a cache memory 13 will be described. This embodiment is characterized in that the cache memory 13 is composed of a volatile cache area 131 that stores data for another DKC and a nonvolatile cache area 132 that stores data for DKC.

Figure 15:
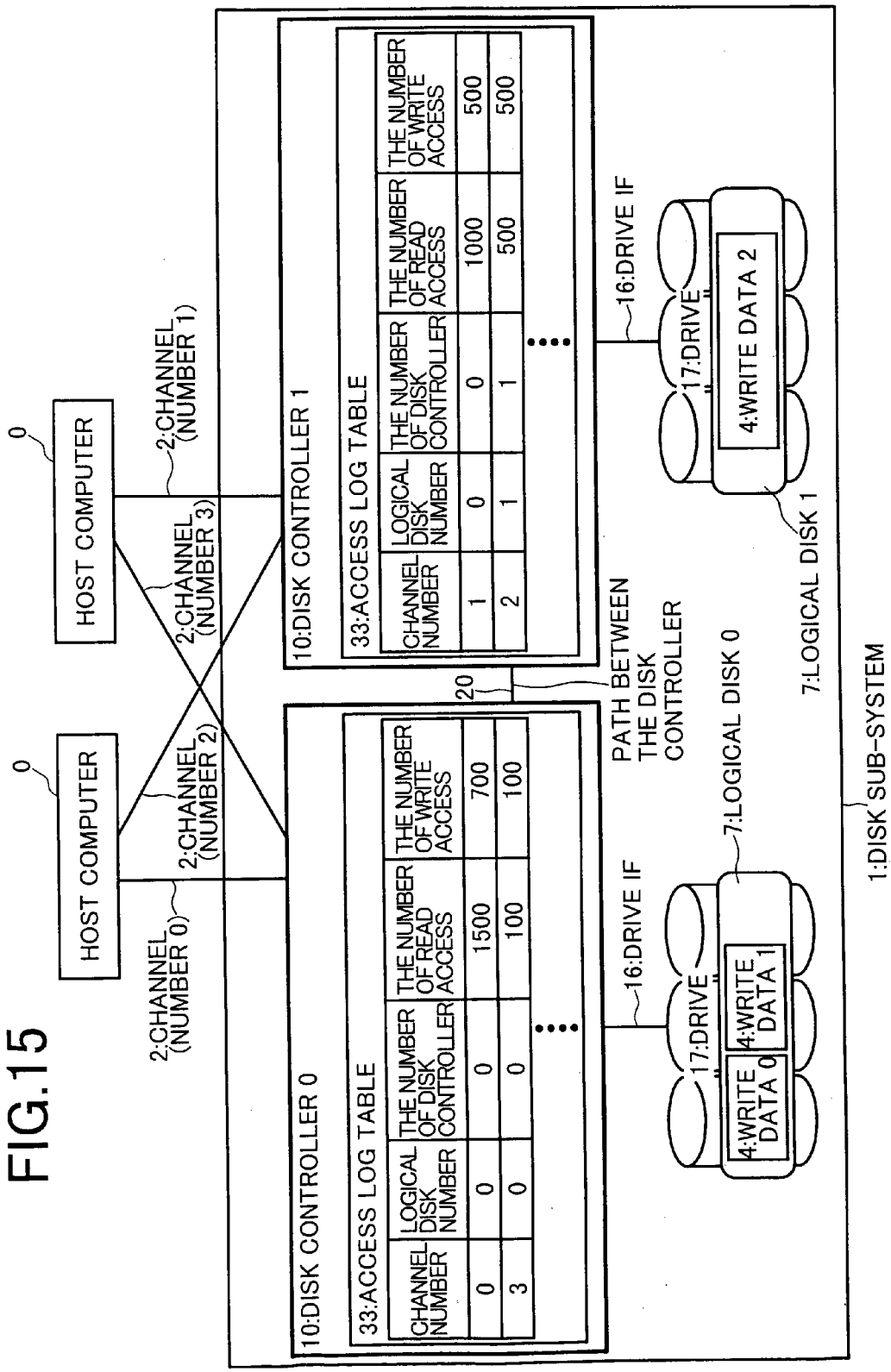
FIG. 15 is another example of a block diagram showing the outline of the disk controller according to the invention.
Figure 16:
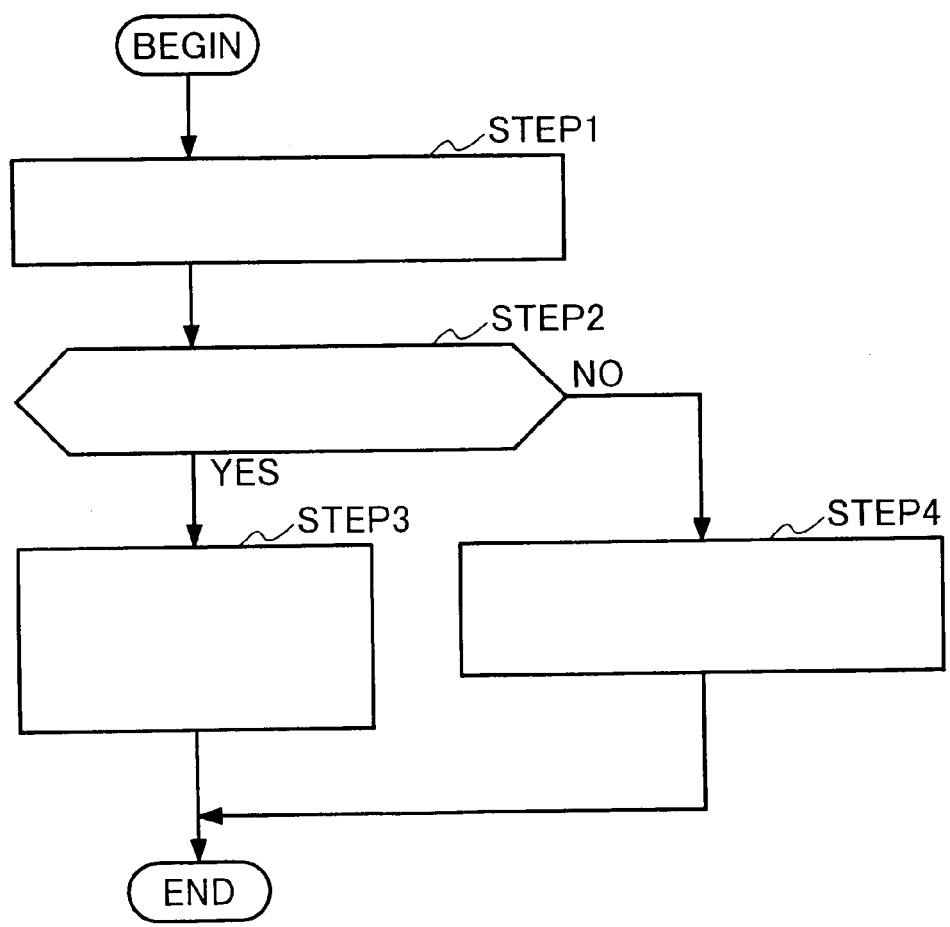
FIG. 16 is a flowchart showing an example of a data location method of the disk controller according to the invention.
Figure 17:
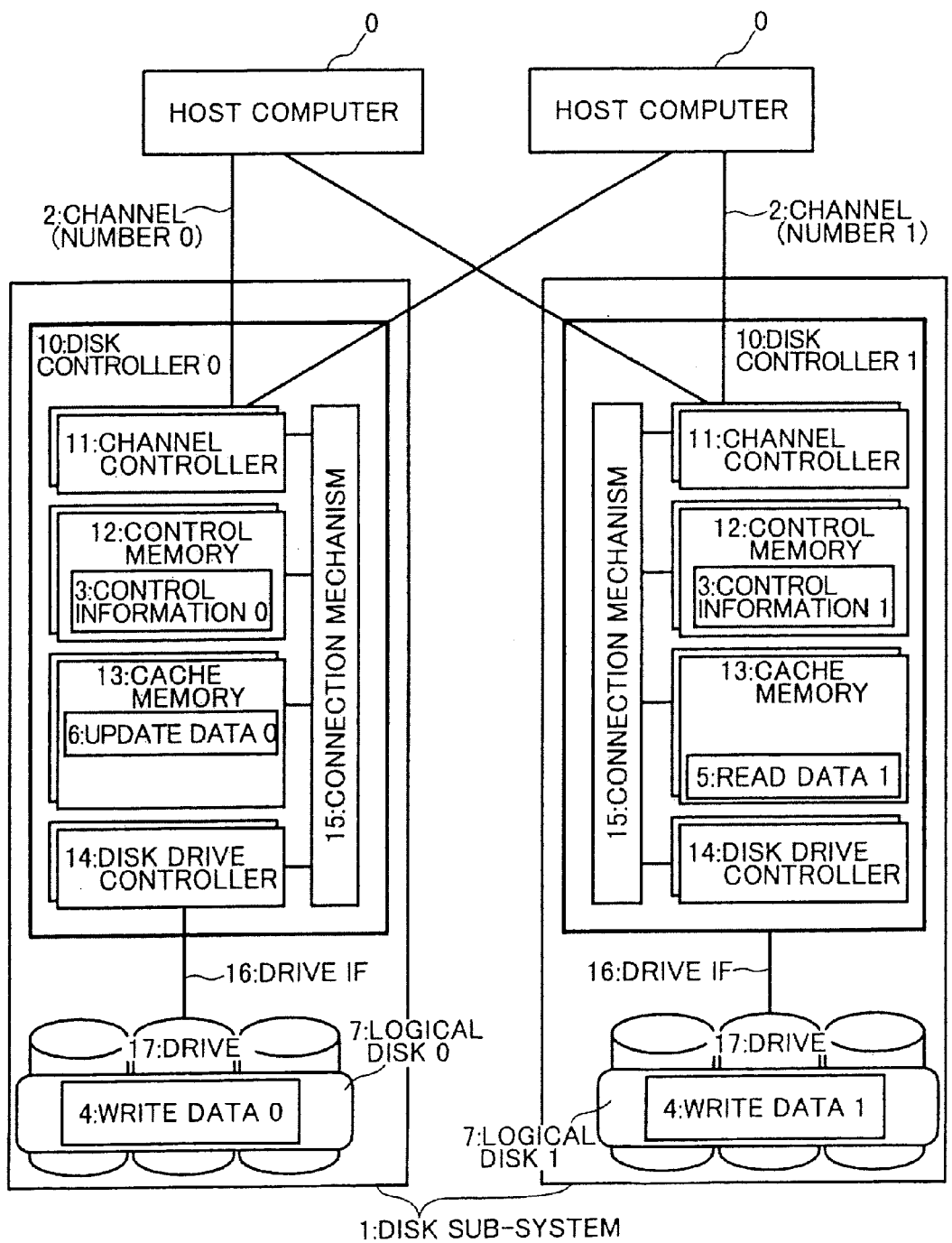
FIG. 17 is a block diagram showing the outline of a conventional type disk controller.
Figure 18:
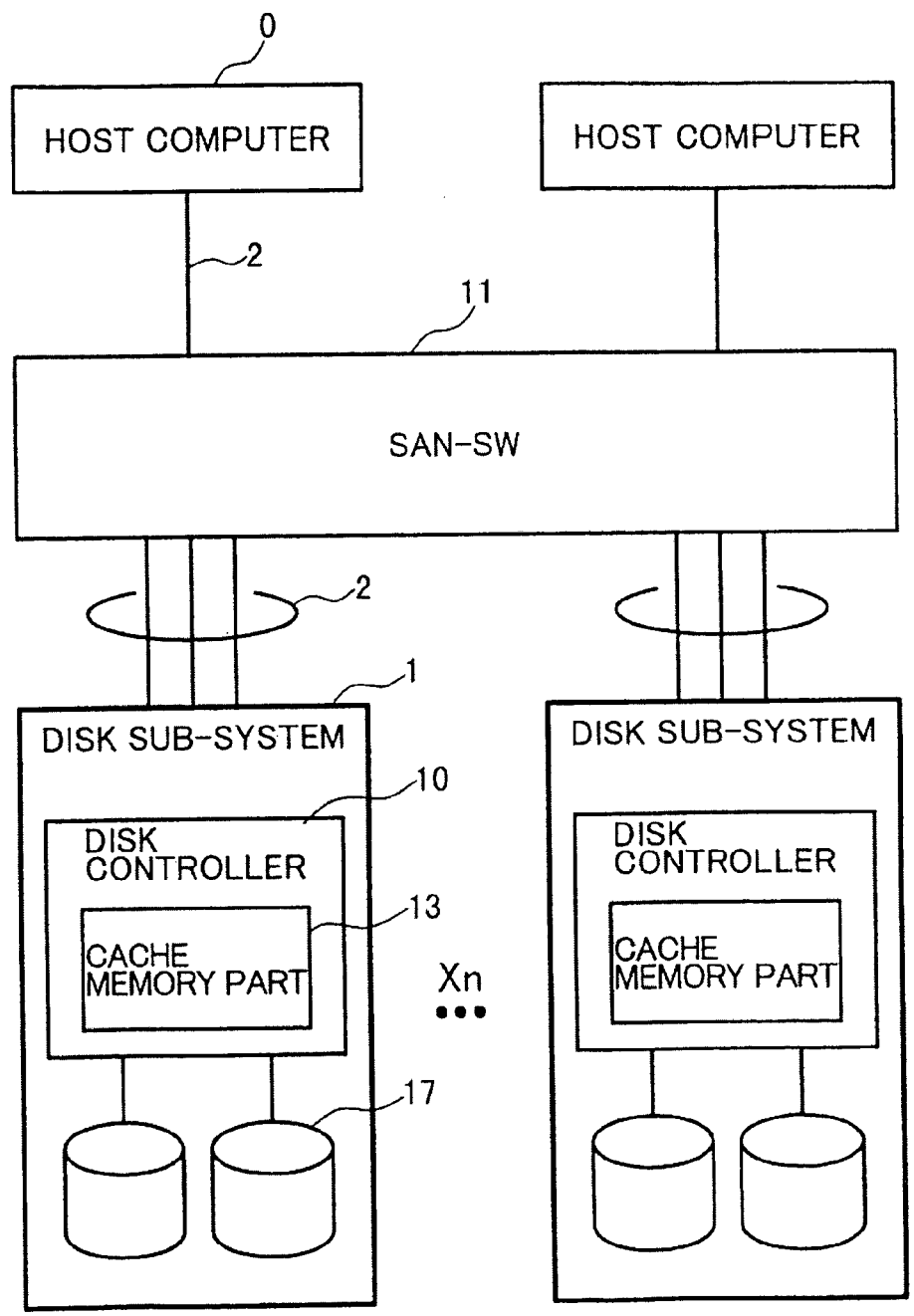
FIG. 18 is a block diagram showing the outline of a conventional type disk controller.

Next, referring to FIGS. 15 and 16, another example of the disk controller will be described. FIG. 15 is a block diagram showing another example of control information stored in the control memory 12 shown in FIG. 1. This embodiment is characterized in that for control information, an access log table 33 showing the statistics of the number of access from a host is provided in addition to a cache management table and a departure configuration table. The access log table 33 shows the number of access every channel number, every logical disk number and every disk controller number. In this embodiment, the number of access is classified into the number of read access and the number of write access and is stored. The number of access has only to be incremented when each processing program accesses to control information in analyzing a command received from a host or in determining a cache hit error. The characteristic of access from a host can be recognized by analyzing the access log table 33 of each DKC in a sub-system. In this embodiment, a logical disk number of 0 is accessed from channel numbers 0, 1 and 3 and it is known that access from the channel 1 requires the transfer of data via a path between disk controllers 20.

Next, referring to FIG. 16, a concrete example of a method of identifying an access frequency will be described. FIG. 16 is a flowchart showing processing according to an access characteristic recognition method which a processing program run in a processor in DKC executes. In this embodiment, it is supposed that the processing program run in the processor in DKC executes, however, a processing program run in a processor for management outside DKC may also execute. Access characteristic recognition processing has only to be periodically executed according to a timer or has only to be executed according to an instruction from a host. First, the number of access to a logical disk of a specific disk controller every channel number is extracted from an access log table 33 of each disk controller and the number of access every channel is compared (a step 1). Next, it is determined whether a DKC number to which a channel, the number of access of which is maximum of the extracted and compared number of access, is connected is the same as a DKC number to which a logical disk to be analyzed is connected or not (a step 2). It is determined based upon the determination whether a channel, the frequency of access to the logical disk of which is high, is connected to the same DKC as the logical disk or not. As a channel the number of access of which is maximum and the logical disk are connected to the same DKC in case the DKC number is the same in the determination in the step 2, the relocation of the logical disk is not required and a channel of DKC to which the logical disk is connected is used for a channel required to use a path between disk controllers 20 of the other channels that access to the logical disk (a step 3). An instruction has only to be given to a processor for the configuration of DKC or a host computer. In the meantime, as a channel the number of access of which is maximum and a logical disk are not connected to the same DKC in case the DKC number described above is not the same as the DKC number to which the logical disk is connected in the determination in the step 2, the channel and the logical disk may be connected to the same DKC. In this embodiment, an instruction is given so that the logical disk is relocated in a drive of DKC to which a channel the number of access of which is maximum is connected (a step 4). As the used frequency of a path between disk controllers is reduced by repeating the steps 1 to 4 by the number of all logical disks in a sub-system and access from a host functions as access to a logical disk of DKC that receives the access, the performance can be maintained even if the band of a path between disk controllers is low.

As each disk controller is provided with a cache memory for storing data for a drive connected to another disk controller except a disk controller that receives an access request from a host via a communication means between the disk controllers in addition to data for the drive connected to the disk controller that receives the access request from the host and a control memory for storing the control information of the cache memory, the sharing of data is enabled between each cache provided to each disk controller and the performance can be enhanced.

Further, as the disk controller is provided with a cache management table that stores a cache directory, in which a disk controller storing data at the destination of access in its cache memory can be specified, and a cache address, at which the data at the destination of access is stored, at every unit of access uniquely determinable based upon the address of a disk controller and a drive as control information for controlling the cache memory provided in the disk controller, the coherence control of the cache memory is enabled.

A disk controller that receives an access request from a host computer executes the exclusive operation of access data at the beginning of processing and afterward, as the exclusion of the following data is released after coherence control is executed in case the access from the host computer is a request for update access and further, a disk controller except the access acceptance disk controller stores the access data in its cache after the access request is processed and the completion is reported to the host, coherence control can be realized without increasing the response time of the host computer.

As the disk controller that receives the request for update access from the host computer stores update data received from the host via a communication method between the disk controllers in a cache memory of a disk controller connected to a drive in case the destination of the update access is the drive connected to another disk controller except the disk controller, a failure can be prevented from being propagated without losing data in another disk controller even if the trouble occurs in a certain disk controller in a disk subsystem.

As according to a method of controlling coherence, data stored in a cache memory of another disk controller is invalidated, coherence control is enabled even if the transfer band of connection means between disk controllers is low.

Also, for another method of controlling coherence, as data stored in a cache memory of another disk controller is updated, the hit ratio of the cache memory is more enhanced and the performance is improved.

A disk controller that receives a request for read access from a host computer first determines whether access data is stored in a cache memory in the disk controller that receives the access request or not, referring to a directory in a cache management table of a disk controller connected to a drive at the destination of access. In case the data is stored, it is transferred to the host computer at once, referring to the cache memory. In the meantime, in case the access data is not stored in the cache memory in the disk controller that receives the access request, it is determined referring to a directory in a cache management table of the disk controller connected to the drive at the destination of access whether the access data is stored in a cache memory of the disk controller connected to the drive at the destination of access or not. In case the data is stored in the cache memory, the cache memory is referred at once and the data is transferred to the cache memory in the disk controller that receives the access request and the host computer. In the meantime, in case the data is not stored in the cache memory of the disk controller connected to the drive at the destination of access, the data is transferred from the drive to the cache memory of the disk controller connected to the drive at the destination of access, the cache memory in the disk controller that receives the access request and the host computer. Therefore, data of a drive connected to a disk controller except the disk controller that receives the access request can be also referred and further, in case the access data is stored in a cache memory, data can be transferred to the host computer in shorter response time, compared with a case that the drive is accessed.

As update data stored in the cache memory is stored in the drive connected to the disk controller and further, the data in the cache of another disk controller storing the data in a disk subsystem is invalidated in case a cache area is freed, the cache can be efficiently used.

A cache memory provided to each disk controller stores only data of a drive connected to a disk controller. In this case, when an access request from a host computer is read access, data is transferred from a cache memory of a disk controller at the destination of the request or a drive to the host computer or when an access request from a host computer is update access, data is transferred to a cache memory of a disk controller at the destination of the request. Therefore, in the case of this control method, as only data of a drive connected to a disk controller is stored in a cache memory of each disk controller, coherence can be maintained without executing complex coherence control.

A cache memory is divided into the storage area of data for a drive connected to a disk controller that receives access and the storage area of data for a drive connected to another disk controller in a sub-system and is managed. As a result, a cache memory the control of which is easy and further which is more efficient or does not require a high cost can be provided.

As data for a drive connected to a disk controller that receives access is stored in a cache memory with the data doubled or multiplexed and in the meantime, data is stored in a cache memory of another disk controller in a sub-system without being multiplexed, higher reliability can be realized and the cost can be reduced, compared with a case that the whole cache memory is doubled.

A cache memory provided to a disk controller is composed of a nonvolatile cache memory that stores data for a drive connected to a disk controller that receives access and a volatile cache memory that stores data for a drive connected to another disk controller in a sub-system. As a result, the capacity of the nonvolatile cache memory requiring a higher cost can be reduced, compared with a case that the whole cache memory is nonvolatilized and the low cost can be realized.

As data of a drive connected to a disk controller in which a failure occurs, which is stored in a cache of a normal disk controller, is invalidated in case the failure occurs in a certain disk controller in a sub-system, the failure is prevented from being propagated even if the failure occurs.

As a communication method between disk controllers is a part of a channel which can be connected to a host computer and a switch connecting channels, cache access is also enabled between plural disk controllers in a sub-system composed of disk controllers having no dedicated connection means between disk controllers.

For control information for controlling a cache memory provided to a disk controller, an access log table storing an access frequency every channel, every disk controller and every logical disk is provided, it is determined whether a channel the access frequency of which is the highest of channels that receive access to a certain logical disk and a logical disk at the destination of access are connected to the same disk controller or not and in case they are not connected to the same disk controller, the logical disk is relocated in a drive of a disk controller to which the channel the access frequency of which is the highest is connected. Also, in case they are connected to the same disk controller, a host computer using another channel that accesses to the logical disk uses a channel of a disk controller connected to the logical disk. As a result, as a data location in a subsystem can be optimized, the used frequency of a path between disk controllers can be reduced and a high band is not required for a path between disk controllers, the cost can be reduced.

What is claimed is:

1. A storage system comprising:
   a plurality of clusters; and
   a communication path which connects each of the clusters,
   wherein each cluster comprises:
   a disk controller, and
   a plurality of disk drives,
   wherein the disk controller of each cluster comprises:
   a disk interface which connects to the disk drives of the cluster,
   a cache memory, and
   a control memory which has stored therein a cache management table,
   wherein said cache management table indicates relationships between identifications of disk controllers, addresses of said disk drives connected to the disk controllers, and addresses in the cache memories at which data of said disk drives are stored,
   wherein a first disk controller stores information indicating relationships between identifications of disk controllers, addresses of disk drives connected to the first disk controller, and addresses in cache memories at which data of said disk drives are stored of a first duster in said cache management table before receiving a write request from a host computer,
   wherein, when the first disk controller receives from a host computer a write request which requests writing of updated data for updating data stored in disk drives of a second disk controller of a second cluster, the first disk controller checks whether data to be updated by the updated data is stored in the cache memory of the second disk controller by referring to the cache management table without sending a request to the second disk controller to obtain information regarding the status of the cache memory of the second disk controller, and if the data to be updated is not stored in the cache memory of the second disk controller, the first disk controller sends the write request to the second disk controller via the communication path, and wherein, in response to the write request from the first disk controller and when the data to be updated is not stored in the cache memory of the second disk controller, the second disk controller updates the data to be updated which is stored in the disk drives of the second disk controller by writing the updated data in the disk drives of the second disk controller via the disk interface based on the write request.

2. A storage system according to claim 1, wherein when the data to be updated is stored in the cache memory of the second disk controller, the second disk controller updates the data to be updated which is stored in the cache memory of the second disk controller by writing the updated data in the cache memory of the second disk controller based on the write request.

3. A storage system according to claim 2, wherein each control memory of the clusters stores a cache directory to identify the disk controller having a disk drive which stores data stored in cache memory.

4. A storage system according to claim 3, wherein said first disk controller receives a completed report indicating completion of the writing of updated data from said second disk controller, and thereafter sends the completed report to said host computer.

5. A storage system according to claim 4, wherein said second disk controller inhibits access to the data to be updated which is the object of said write request until said first disk controller sends the completed report to the host computer.

* * * * *